March 17, 1964  J. S. KLEINBERG ETAL  3,125,358
BUILDING LEAD-IN CONNECTION FOR A PIPE
Filed Jan. 31, 1962
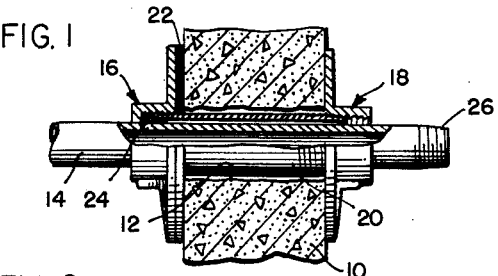
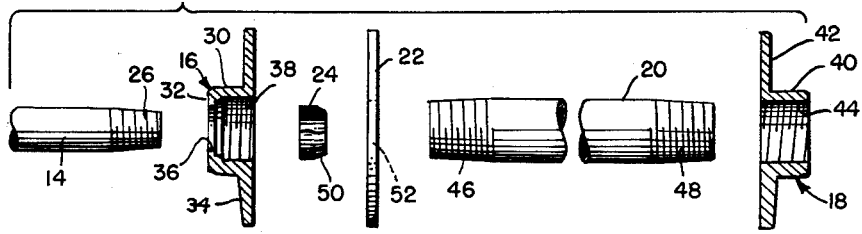
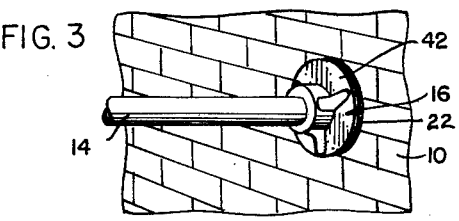
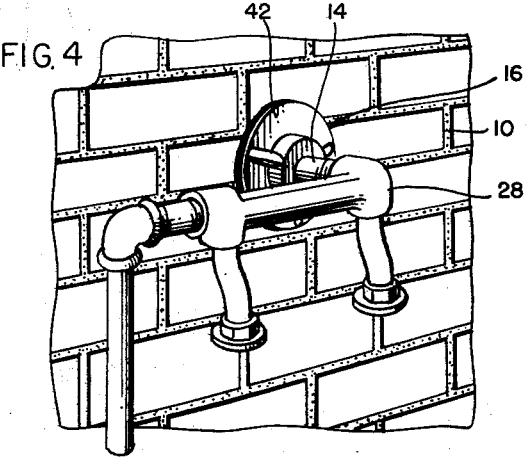
INVENTORS:
JOSEPH. S. KLEINBERG
DONALD R. MacCOLLUM
BY
ATT'Y

# United States Patent Office 3,125,358
Patented Mar. 17, 1964

3,125,358
BUILDING LEAD-IN CONNECTION FOR A PIPE
Joseph S. Kleinberg, 217 Shirewood Drive, Rochester 25, N.Y., and Donald R. MacCollum, 7 Winhurst Drive, Rochester, N.Y.
Filed Jan. 31, 1962, Ser. No. 170,186
1 Claim. (Cl. 285—55)

The present invention relates to building lead-in connections for gas line service pipes and has particular reference to a novel assembly of fittings, such assembly serving, after proper installation thereof, to conduct a gas service pipe through a building foundation or other wall, and utilizing (1) a sleeve to protect the portion of the service pipe which is contained within the wall, (2) a gasketed outside flange nut which bears against the outside surface of the wall to seal the pipe opening against seepage, (3) a sleeve gasket which is compressed between the protecting sleeve and the service pipe to prevent seepage into the annular space between the sleeve and the service pipe, and (4) an inside flange nut which, in combination with the sleeve pipe, allows for a limited degree of end play of the inner end of the service pipe within the building enclosure and thus facilitates coupling thereof to a distribution manifold, meter bar, or other connecting device.

By the novel arrangement of fittings briefly outlined above, numerous additional advantages over conventional lead-in connections are obtained, and principal among these are, protection of the service pipe from the adverse effects of corrosion; elimination of the necessity of patching or grouting the area of the pipe entrance opening in the building foundation or other wall; the provision of a lead-in connection which allows for expansion of the service pipe without slippage at the sealing areas; and the provision of a connection which will permit removal or replacement of the service pipe without necessitating chipping of the wall opening, or, in fact, removal of the outside gasketed flange nut.

The provision of a building lead-in connection which possesses the various advantages and features heretofore mentioned constitutes the principal object of the present invention.

Additional desirable features of the invention are the provision of a lead-in gas line connection which is rugged and durable and, therefore, will withstand rough usage; a connection which holds the service pipe securely in place and resists pull-out thereof, as, for example, when the pipe is snagged by moving construction equipment at the scene of installation; and a connection in which limited axial shifting of the pipe is permitted without destruction of the various seals which are associated therewith.

Other objects and advantages of the invention, not at this time enumerated, will be apparent from a consideration of the following detailed description.

In the accompanying single sheet of drawings forming a part of this specification, one exemplary form of the invention has been shown.

In this drawing:

FIG. 1 is a sectional view taken substantially centrally and longitudinally through a lead-in connection constructed in accordance with the principles of the present invention, and showing the same installed in a building foundation wall;

FIG. 2 is an exploded longitudinal sectional view, partly in elevation, showing the constituent parts of the improved lead-in connection;

FIG. 3 is a fragmentary perspective view of the installation of FIG. 1 as seen from outside the foundation wall; and FIG. 4 is a fragmentary perspective view of the installation of FIG. 1 as seen from inside the foundation wall.

Referring now to the drawing in detail wherein, for purpose of illustration, there has been disclosed a preferred embodiment of the invention, a portion of a building foundation wall has been designated in its entirety by the reference numeral 10 in FIG. 1, and is shown as being provided with a transverse opening 12 through which the terminal portion of a gas line service pipe 14 projects.

The lead-in connection of the present invention comprises five principal parts and they consist of an outside flange nut 16, an inside flange nut 18, a sleeve pipe 20, an annular wall flange gasket 22, and a sleeve gasket 24, the details of these parts being clearly shown in FIG. 2 and their association with one another being shown in FIG. 1.

The gas line service pipe 14 is of conventional construction and the terminal end portion thereof is exteriorly threaded as at 26 for connection to a suitable fitting, as, for example, the meter bar union connection shown at 28 in FIG. 4.

The outside flange nut 16 is generally of cup-shaped design and includes a cylindrical side wall 30, a bottom wall 32 and a comparatively wide rim flange 34. The bottom wall 32 is formed with an opening 36 therethrough for reception of the service pipe 14. The side wall 30 is interiorly threaded as at 38.

The inside flange nut 18 includes a cylindrical side wall 40 and a comparatively wide rim flange 42. The cylindrical body portion 40 is interiorly threaded as at 44.

The sleeve pipe 20 is of a length slightly greater than the over-all thickness of the foundation wall 10 and the end regions thereof are exteriorly threaded as at 46 and 48.

The sleeve gasket 24 is in the form of a short but slightly elongated ring of elastomeric material, such as rubber, either natural or synthetic, or a rubber substitute. Preferably, it is of cylindrical design with the forward rim region thereof being tapered as at 50 on an outside bevel. The internal diameter of the sleeve gasket is equal to, or slightly less than, the external diameter of the service pipe 14 so that the gasket will fit telescopically over this pipe with a snug frictional fit.

The wall flange gasket 22 is in the form of a comparatively wide flat ring having a central opening 52 of a diameter substantially equal to the internal diameter of the cylindrical side wall 30 of the flange nut 16. The gasket 22 is formed of soft pliable elastomeric material, such as rubber, which, under the continued application of pressure thereto, becomes bonded to the material against which it bears.

In effecting a typical installation such as that shown in FIG. 1, the outside flange nut 16 is first telescopically received over the service pipe 14, after which the sleeve gasket 24 is slipped over the terminal end of the service pipe and moved into position within the cupped portion of the flange nut 16. Thereafter, the end 46 of the sleeve pipe 20 is threaded into the threaded portion 38 of the side wall 30 of the flange nut 16. This threading operation compresses the central and outer end portions of the sleeve gasket 24 between the outer end of the sleeve pipe and the bottom wall 32 of the flange nut 16, and also compresses the tapered inner end portion of the sleeve gasket between the inside wall surface of the outer end portion of the sleeve pipe and the outside wall surface of the service pipe, thereby effecting a seal between the service pipe and the sleeve pipe. The flat annular wall flange gasket 22 is then positioned against the rear face of the rim flange 34 and the end of the service pipe 14 is passed through the wall opening 12 and moved axially therethrough until the wall flange gasket 22 engages the outside face of the fall 10 in face-to-face relationship. The inside flange nut 18 is then threaded onto the threaded end portion 48 of the sleeve pipe 20 so that the sleeve pipe 20 and flange nut 16 are drawn bodily as a unit to the right, as viewed in FIG. 1, and so that the wall flange gasket 22 becomes compressed between the outside face of the wall and the rim flange 34. The connection installation is then complete and such inside connections as may be desired may be effected on the threaded end region of the service pipe 14.

If at any time it becomes necessary to replace the service pipe 14, it is only necessary to unscrew the outside and inside flange nuts 16 and 18 from the threaded end regions of the sleeve pipe 20, after which the service pipe may be pulled outwardly from the installation. Replacement thereof may be effected by following the procedure outlined in connection with the initial installation.

The invention is not to be limited to the exact arrangement of parts shown in the accompanying drawing or described in this specification as various changes in the details of construction may be resorted to without departing from the spirit or scope of the invention. For example, the service pipe 14 may be in the form of a tube or other conduit and may be used to enclose electrical conductors or other items instead of supplying or furnishing gas.

Having thus described the invention what we claim as new and desired to secure by Letters Patent is:

The combination with a building having a wall structure with an opening therethrough, and a service pipe projecting completely through said opening from the outside of the building to the building interior, of a lead-in connection for said service pipe, said lead-in connection comprising a sleeve pipe extending coaxially around and spaced radially outwards from said service pipe, projecting completely through the opening, and having its ends terminating outwardly a short distance beyond the outer and inner rims of said opening respectively, a cup-shaped outer flange nut surrounding said service pipe at a point directly outwards of the outer rim of the opening in the building wall structure and consisting of a cylindrical side wall, a bottom wall connected to, and extending transversely across, the outer end of the cylindrical side wall and provided with an opening through which the service pipe extends, and a comparatively large flat radial flange connected to, and extending outwards from, the inner end of the cylindrical side wall, said cylindrical side wall being interiorly threaded, the outer end portion of the sleeve pipe being externally threaded and threadedly received directly in the inner end region of said cylindrical side wall of the outer flange nut, an elongated sleeve gasket fitting snugly within and extending lengthwise of the cylindrical side wall of the outer flange nut, surrounding the adjacent portion of said service pipe and having its outer end in abutment with the bottom wall of said outer flange nut, said sleeve gasket being generally cylindrical and having the outer periphery of its inwardly directed end region tapered inwardly and projecting into the outer end portion of said sleeve pipe, said sleeve gasket, when the outer end portion of the sleeve pipe is screwed into connected relation with the cylindrical side wall of the outer flange nut, having its central and outer end portions compressed directly between said outer end portion of the sleeve pipe and the bottom wall of the outer flange nut in such manner that they are in direct and firm gripping and sealing relation with said adjacent portion of the service pipe, the tapered inwardly directed end region of the sleeve gasket being compressed directly between said outer end portion of the sleeve pipe and the adjacent portion of the service pipe when said outer end portion of the sleeve pipe is in full connected relation with the cylindrical side wall of the outer flange nut, a resilient flange gasket surrounding the outer end portion of the sleeve pipe and interposed between the flange of said outer flange nut and the outside face of the wall structure, and an inner flange nut extending around the inner end portion of the sleeve pipe and consisting of an internally threaded cylindrical side wall and a comparatively large flat radial flange connected to, and extending outwards from, the inner end of the last mentioned cylindrical side wall, said inner flange nut having its cylindrical side wall threadedly received on the inner end portion of the sleeve pipe and its radial flange bearing against the side face of the building wall strutcure and being adapted when screwed onto said inner end portion of the sleeve pipe to its fullest extent to apply tension to the sleeve pipe and thus compress said flange gasket between the radial flange of the outer flange nut and the outside face of said building wall structure.

References Cited in the file of this patent

UNITED STATES PATENTS

| 568,217 | Spahr | Sept. 22, 1896 |
| 1,592,716 | Blowers | July 13, 1926 |
| 2,564,302 | Fraser | Aug. 14, 1951 |

FOREIGN PATENTS

| 579,721 | Canada | July 21, 1959 |